United States Patent [19]

Yip

[11] 4,044,786
[45] Aug. 30, 1977

[54] LOAD SENSING STEERING SYSTEM WITH DUAL POWER SOURCE

[75] Inventor: James K. Yip, Richfield, Minn.
[73] Assignee: Eaton Corporation, Cleveland, Ohio
[21] Appl. No.: 708,657
[22] Filed: July 26, 1976
[51] Int. Cl.$^2$ .................... F15B 11/16; F15B 18/00
[52] U.S. Cl. ........................ 137/101; 60/421; 60/422
[58] Field of Search ............... 137/101; 60/421, 422

[56] References Cited

U.S. PATENT DOCUMENTS

| | | | |
|---|---|---|---|
| 3,455,210 | 7/1969 | Allen | 91/446 |
| 3,877,345 | 4/1975 | Ohms et al. | 60/422 X |
| 3,994,133 | 11/1976 | Pfeil et al. | 60/422 |

Primary Examiner—Robert G. Nilson
Attorney, Agent, or Firm—Teagno & Toddy

[57] ABSTRACT

A system for providing pressurized fluid to a primary load circuit and an auxiliary load circuit, the primary load circuit being of the type which provides a load pressure signal representative of the demand for fluid in the primary load circuit. The system includes first and second fluid pumps feeding first and second priority flow control valves, respectively, each of which has a primary outlet port connected to the primary load circuit and an auxiliary outlet port connected to the auxiliary load circuit. When the flow demand of the primary load circuit can be satisfied by the first pump, any excess flow available is fed by the first flow control valve to the auxiliary load circuit, and all of the flow from the second pump goes to the auxiliary circuit. If the flow demand of the primary load circuit is greater then the capacity of the first pump, all of its flow passes to the primary load circuit with none going to the auxiliary load circuit, and a novel pilot valve arrangement permits the load pressure signal from the primary load circuit to bias the second flow control valve to a position where a sufficient amount of the flow from the second pump is fed to the primary load circuit to meet the demand thereof, with the remainder of the flow going from the second flow control valve to the auxiliary load circuit.

7 Claims, 4 Drawing Figures

LOAD SENSING STEERING SYSTEM WITH DUAL POWER SOURCE

BACKGROUND OF THE DISCLOSURE

The present invention relates to a system for providing pressurized fluid to a plurality of load circuits, and more particularly, to such a system in which one of the load circuits must be given "priority", i.e., the full flow demand of that primary circuit must be satisfied, with any excess flow available going to an auxiliary circuit.

Although the system of the present invention is equally adapted to any arrangement in which pressurized fluid is required for a primary load circuit and an auxiliary load circuit, its use is especially advantageous in arrangements in which the primary load circuit comprises a vehicle power steering system, and will be described in connection therewith.

It is known in the prior art to provide pressurized fluid to both a primary load circuit and an auxiliary load circuit by means of a single fluid pump and priority flow control valve. See U.S. Pat. No. 3,455,210, assigned to the assignee of the present invention. In view of the current concern over the efficient utilization of energy, one of the operating characteristics of such priority systems may represent a disadvantage. This characteristic is that when providing fluid to two different load circuits at substantially different load pressures (e.g., 1000 psi and 2000 psi), the priority valve must throttle the source pressure down to the lower load pressure, this throttling causing a substantial amount of the input energy to the pump to be converted to heat and wasted.

It is also known in the prior art to utilize one pump for the primary load circuit, and another pump for the auxiliary load circuit, with each of the pumps having sufficient capacity to satisfy the flow and pressure demands of its associated load circuit. This type of arrangement obviously results in unnecessary and expensive pump capacity.

SUMMARY OF THE INVENTION

Accordingly, it is an object of the present invention to provide a system of the class described in which the first pump provides fluid to the primary load circuit and the second pump may also provide its flow output, or a portion thereof, to the primary load circuit in response to a load pressure signal from the primary circuit.

It is another object of the present invention to provide such a system in which any excess flow from the first pump is available at the auxiliary load circuit.

It is a more specific object of the present invention to provide such a system in which the flow control valve associated with the second pump is responsive to a load pressure signal from the primary load circuit, with the availability of the load pressure signal at the flow control valve being controlled by a pilot valve arrangement which is responsive to the pressure of fluid flowing to the auxiliary load circuit from the flow control valve associated with the first pump.

The above and other objects of the present invention are accomplished by the provision of a system which provides pressurized fluid, on demand, to a primary load circuit and to an auxiliary load circuit means. The primary load circuit includes means providing a load pressure signal representative of the demand for fluid in the primary load circuit. The system comprises a first source of fluid and a first flow control valve including an inlet port in fluid communication with the first fluid source, a first primary outlet port, a first auxiliary outlet port, and first means biasing the valve toward a position permitting substantially all of the flow from the inlet port to pass to the first primary outlet port. A first primary fluid conduit communicates between the first primary outlet port and the primary load circuit, while an auxiliary fluid conduit communicates between the first auxiliary outlet port and the auxiliary load circuit means. The system further comprises a second source of pressurized fluid and a second flow control valve including an inlet port in fluid communication with the second fluid source, a second primary outlet port, a second auxiliary outlet port in fluid communication with the auxiliary load circuit means, and second means biasing the valve toward a position permitting substantially all of the flow from the inlet port to pass to the second primary outlet port. A second primary fluid conduit communicates between the second primary fluid outlet and the first primary fluid conduit. Means is provided to communicate a pressure signal from the first primary fluid conduit to exert a biasing force on each of the first and second flow control valves in opposition to that of the first and second biasing means, respectively. There is a first means communicating a load pressure signal to exert a biasing force on the first flow control valve in the same direction as the first biasing means and a second means communicating the load pressure signal to exert a biasing force on the second flow control valve in the same direction as the second biasing means. A third valve means is disposed in the second signal communicating means and includes an inlet port, a signal port, a tank port, and means biasing the valve toward a position permitting communication of the load pressure signal. A pressure signal is communicated from the auxiliary fluid conduit to exert a biasing force on the third valve means in opposition to that exerted by the biasing means and toward a position blocking communication of the load pressure signal and relieving the load pressure signal at the second flow control valve.

DESCRIPTION OF THE PREFERRED EMBODIMENT

Figure 1:
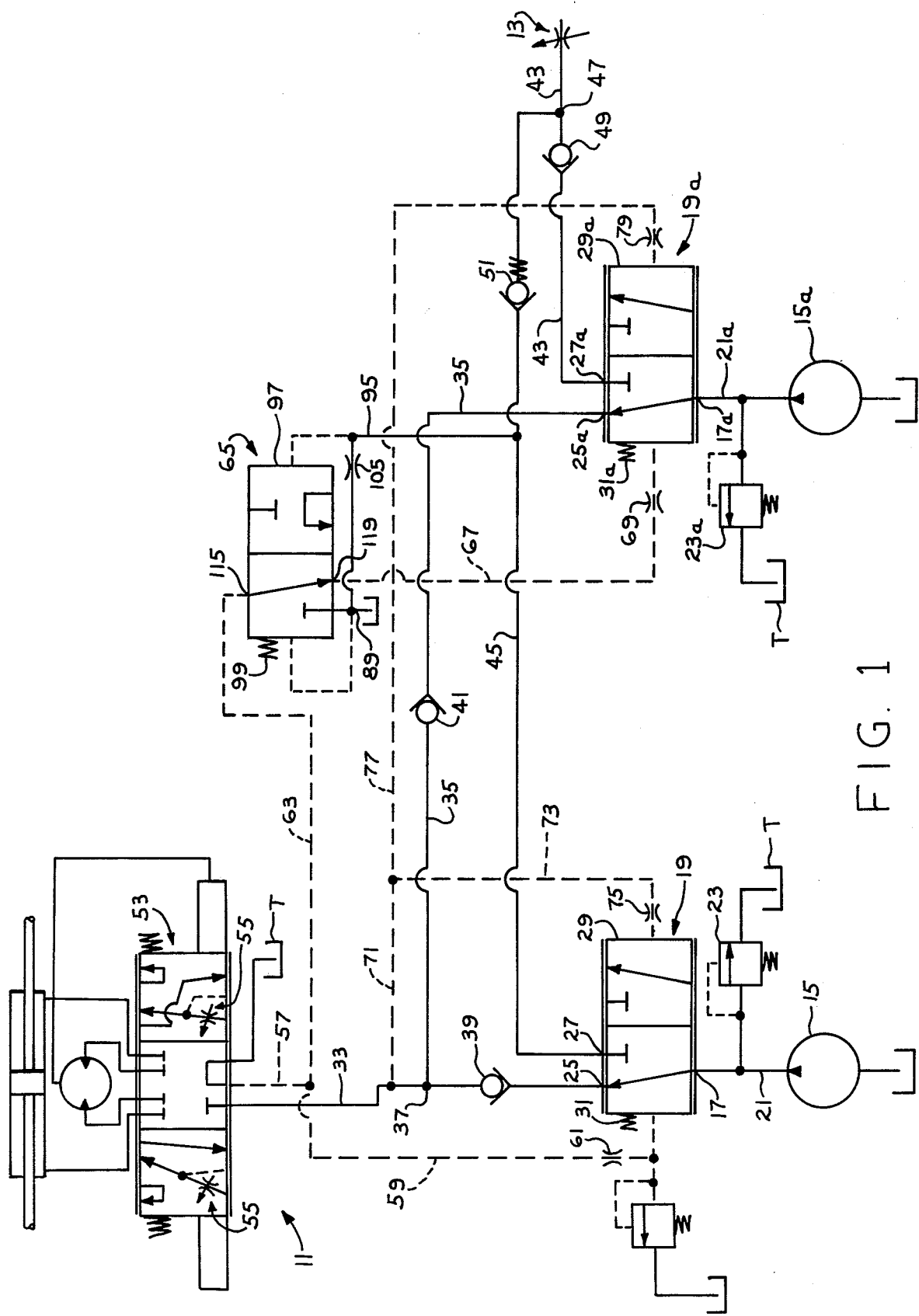
FIG. 1 is a hydraulic schematic of a preferred embodiment of the present invention.

Referring now to the drawings, which are not intended to limit the invention, FIG. 1 illustrates schematically a system for providing pressurized fluid to a hydrostatic power steering system, generally designated 11, which comprises the primary or "priority" load circuit, and an auxiliary load circuit, generally designated 13, which, for purposes of simplicity, is illustrated merely as a flow orifice. The system of the invention comprises a primary sub-system and an auxiliary sub-system. The primary sub-system includes a fluid pump 15, the output of which is fed to an inlet port 17 of a priority flow control valve, generally designated 19 by means of a conduit 21. In fluid communication with the conduit 21 is a sub-system relief valve 23, which is adapted to relieve to tank any excessive pressure buildups. The flow control valve 19 also includes a primary outlet port 25, an auxiliary outlet port 27, a movable valve member 29, and a spring 31 which biases the valve member 29 toward the position shown in FIG. 1, in which substantially all of the flow from the inlet port 17 passes to the primary outlet port 25. It should be appreciated that the priority flow control valve 19 may be of the type well known in the art, such as is illustrated in the above-mentioned U.S. Pat. No. 3,455,210, which is incorporated herein by reference.

This system also includes an auxiliary sub-system which is substantially the same as the primary sub-system just described, and in which like elements bear like numerals, plus the designation a. It should be understood by those skilled in the art that because the fluid pump 15a is shown as being fixed displacement, the auxiliary load circuit 13 should be open-center. Further, in the embodiment of FIG. 1, the fluid pumps 15 and 15a may be fixed displacement, variable displacement, or load sensing (if load circuit 13 is open-center, closed-center or load-sensing, respectively), but both of the pumps should be the same.

The primary outlet port 25 is connected to the steering control system 11 by means of a fluid conduit 33 and the primary outlet port 25a is connected by means of a fluid conduit 35 to the fluid conduit 33 at a fitting 37. A ball check valve 39 is disposed in the fluid conduit 33, upstream from the fitting 37 and a ball check valve 41 is disposed in the fluid conduit 35, also upstream from the fitting 37, the ball checks 39 and 41 being utilized for the purpose of preventing any back-flow in the conduits 33 and 35, respectively.

In a similar manner, the auxiliary outlet port 27a is connected to the auxiliary load circuit 13 by means of a conduit 43 and the auxiliary outlet port 27 is connected to the fluid conduit 43 by means of a fluid conduit 45, at a fitting 47. A ball check valve 49 is disposed in the fluid conduit 43 and a ball check valve 51 is disposed in the fluid conduit 45, the ball check valves 49 and 51 being utilized to prevent any back-flow in the fluid conduits 43 and 45, respectively.

The hydrostatic power steering system 11 includes a valving arrangement 53 which, when shifted from the neutral position shown FIG. 1 to either the left turn position or the right turn position, defines a variable flow control orifice 55. The valving 53, in a manner well known in the art, provides a load pressure signal 57, taken from downstream of the variable orifice 55. The load pressure signal 57 is communicated by means of a signal line 59 back through an orifice 61 to the spring chamber of the flow control valve 19 to bias the valve member 29 in the same direction as does the spring 31, i.e., toward the position shown in FIG. 1. It will be appreciated, of course, that the flow control valve 19 will be in the position shown in FIG. 1 only when the valving arrangement 53 is shifted from the neutral position of FIG. 1 to either a left turn or a right turn condition. The load pressure signal 57 is also communicated by means of a signal line 63 to a pilot valve, generally designated 65, which controls, in a manner to be described subsequently, the communication of the pressure signal from the signal line 63 to a signal line 67, the signal line 67 communicating the pressure signal through an orifice 69 to the spring chamber of the flow control valve 19a, to bias the valve member 29a in the same direction as does the spring 31a, i.e., toward the position shown in FIG. 1.

Another pressure signal is taken from upstream of the variable orifice 55, and preferably, at a point downstream from the fitting 37. In the subject embodiment, the second pressure signal is communicated by means of a signal line 71 to a signal line 73 which communicates the pressure signal through an orifice 75 to exert a biasing force on valve member 25 in opposition to that exerted by the spring 31. The signal line 71 also communicates with a signal line 77 which communicates the pressure signal through an orifice 79 to exert a biasing force on the valve member 29a in opposition to that exerted by the spring 31a.

Figure 2:
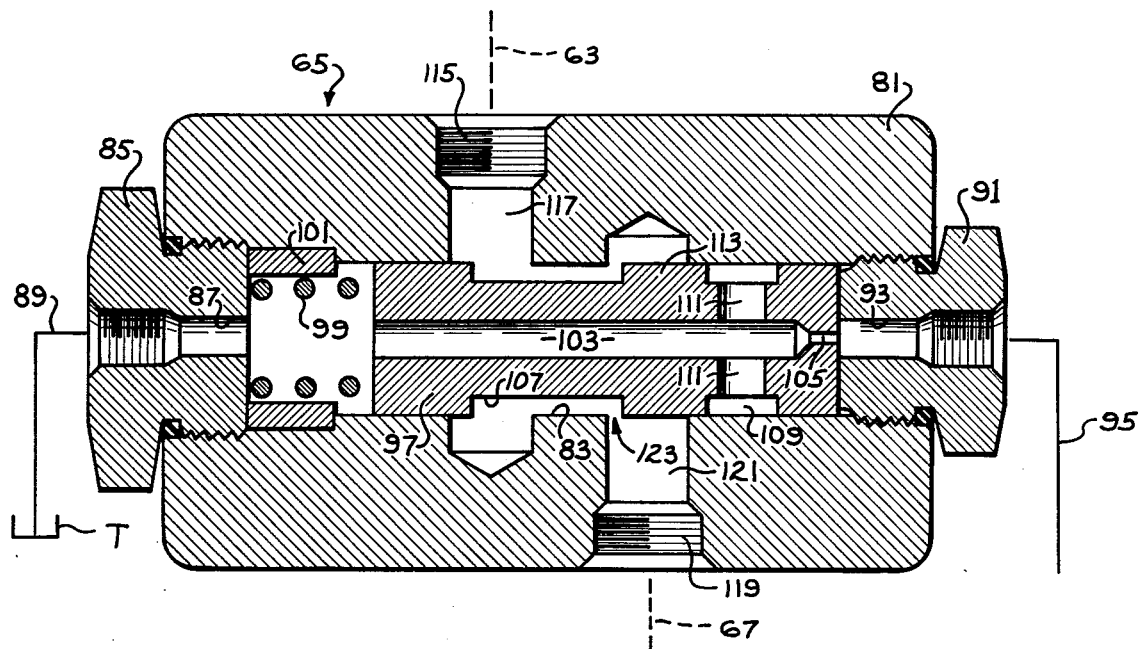
FIGS. 2 and 3 are cross-sections of the pilot valve utilized in the system of the present invention, illustrated in the two different operating positions.
Figure 3:
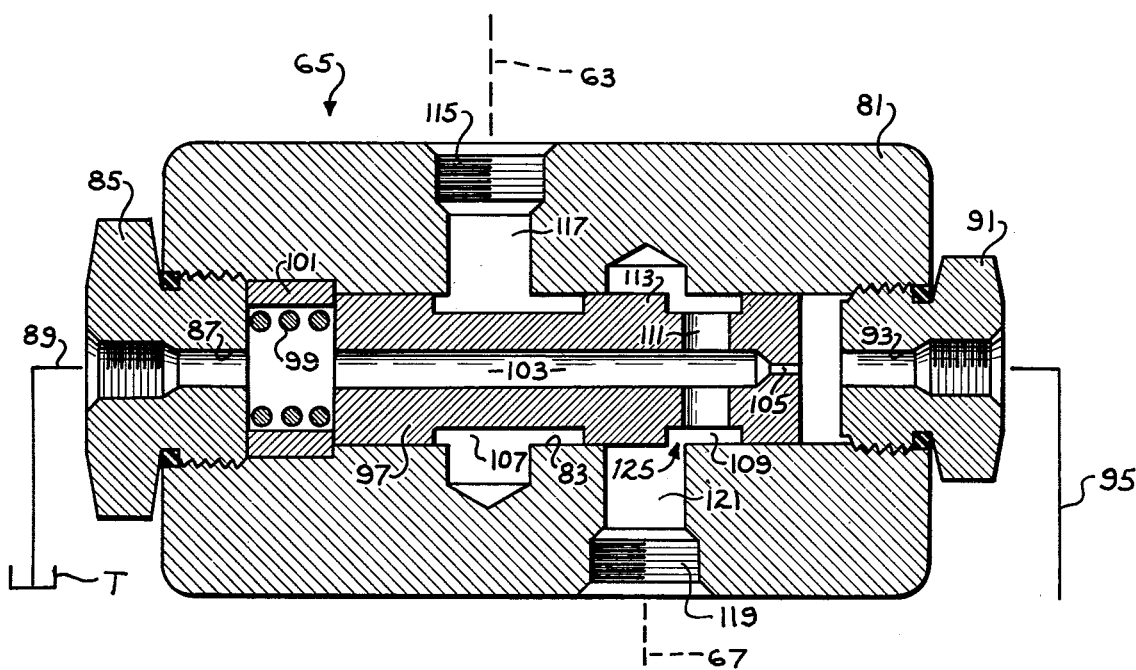

Referring now to FIGS. 2 and 3, in conjunction with FIG. 1, the pilot valve 65 and its relationship to the remainder of the system will be described in greater detail. Pilot valve 65 includes a valve body 81 which defines a main spool bore 83. At the left end (as seen in FIG. 2) of the spool bore 83 is a fitting 85 which is in threaded engagement with the valve body 81, the fitting 85 providing a port 87 in fluid communication with tank by means of a line 89. At the right end of the spool bore 83 is a fitting 91 in threaded engagement with the valve body 81 and providing a fluid port 93 in communication with the fluid conduit 45 by means of a conduit 95. Disposed within the spool bore 83 is a valve spool 97 which, in the absence of fluid pressures, is biased toward the position shown in FIG. 2 by means of a spring 99. Disposed within an enlarged portion of the spool bore 83, and adjacent the fitting 85 is a spool stop 101 which, as may best be seen in FIG. 3, limits the leftward movement of the valve spool 97. The valve spool 97 defines an axially-extending bore 103 which is in fluid communication with the port 93 by means of a fixed orifice 105 which, in the subject embodiment, has a diameter of approximately 0.030 inches (0.76 mm). The valve spool 97 further defines a relatively wide annular groove 107, and a substantially narrower annular groove 109, the groove 109 being in continuous fluid communication with the axial bore 103 by means of a plurality of radial passages 111. The annular grooves 107 and 109 define therebetween an annular land 113, the function of which will be described subsequently.

The valve body 81 defines an inlet port 115 which receives the pressure signal line 63 and communicates with the spool bore 83 by means of a fluid passage 117. The valve body 81 also defines a signal port 119 which is connected to the pressure line 67 and communicates with the spool bore 83 by means of a fluid passage 121.

OPERATION

It is an important feature of the system of the present invention that it is responsive primarily to the pressure demand of the primary load circuit 11, as represented by the load pressure signal 57 communicated by the signal lines 59 and 63, and to the flow demand; as represented by the differential between the load pressure signal 57 and the load pressure in the signal line 71 (and signal lines 73 and 77). It is an essential feature of the present invention that, depending upon the demand for fluid by the primary load circuit 11, each of the sub-systems may provide some, all, or none of its respective output capacity to the primary load circuit 11 and auxiliary load circuit 13 in any one of the following combinations:

|     | Primary sub-system flow | | Auxiliary sub-system flow | |
|     | load circuit | | load circuit | |
|     | 11 | 13 | 11 | 13 |
| (a) | all | none | all | none |
| (b) | all | none | some | some |
| (c) | all | none | none | all |
| (d) | some | some | none | all |
| (e) | none | all | none | all |

The manner in which these various conditions are achieved will now be described. When pressure and flow are demanded by the primary load circuit 11, a pressure load signal 57 is communicated to the flow control valve 19 in the manner previously described. If the flow demand of the load circuit 11 is greater than the capability of the pump 15, the imbalance between the load pressure signals in the signal lines 59 and 73 will be sufficient to bias the valve member 29 to a position (as shown in FIG. 1) in which all of the fluid passes from the inlet port 17 to the primary outlet port 25. In this condition, there is no substantial pressure or flow from the auxiliary outlet port 27 through the fluid conduit 45. The same will, of course, be true in the fluid conduit 95, such that the pilot valve 65 will be in the position shown in FIG. 2 with the spring 99 biasing the spool 97 against the fitting 91. With the spool 97 in the position shown in FIG. 2, the annular land 113 cooperates with the spool bore 83 to define an orifice 123. The orifice 123 permits the load pressure signal in signal line 63 to be communicated through fluid passage 117 to fluid passage 121, then through signal line 67 to exert a biasing force on valve member 29a in the manner previously described. The imbalance between the load pressures in signal lines 67 and 77 is such that the valve member 29a is biased to a position in which the amount of fluid, if any, which flows from the inlet port 17a to the primary outlet port 25a is just enough, in addition to that supplied by fluid pump 15, to satisfy the demand of the load circuit 11. The excess fluid, if any, at inlet port 17a flows to auxiliary outlet port 27a, and then to the auxiliary load circuit 13. The foregoing description would, therefore, cover conditions (a), (b), and (c) from the preceding table.

The next situation which will be described is that in which the flow demand of the load circuit 11 is less than the capacity of the fluid pump 15. When this occurs, the amount of fluid flowing from the inlet port 17 to the primary outlet port 25 is just sufficient to satisfy the flow demand of load circuit 11, with the excess flow passing to the auxiliary outlet port 27. Therefore, in this situation, there is fluid pressure and flow through fluid conduit 45, and substantially the same pressure in conduit 95, but a very low flow rate, the flow rate being limited by the size of the fixed orifice 105. The fluid pressure in conduit 95 is communicated through fluid port 93 and exerts a biasing force on the valve spool 97 to bias the spool to the position shown in FIG. 3 in which the orifice 123 is closed off to block communication of the load pressure signal from the signal line 63 to the signal line 67. With the valve spool 97 in the position shown in FIG. 3, the load pressure in signal line 67 (and passage 121) is communicated through an orifice 125 to annular groove 109, from where it is free to flow through the radial passages 111, the axial bore 103 and out port 87 through line 89 to tank. With the load pressure in signal line 67 relieved in a manner just described, the only forces acting on the valve member 29a are the spring 31a and the load pressure in signal line 77, such that the valve member 29a will be in a position in which all of the fluid at inlet port 17a passes to auxiliary outlet port 27a, and to the auxiliary load circuit 13.

It is believed that the operation of the system of the present invention may be better understood by reference to an example in which it is assumed that the load in the primary circuit 11 is 2000 psi and the load in the auxiliary circuit 13 is 1000 psi, and as the flow (Q) demand in the load circuit 11 varies, as represented by the six different condition numbers, the top half of the table indicates the pressure and flow at each of the outlet ports, as well as the position of the pilot valve 65, by reference to either FIG. 2 or FIG. 3. It should be noted that for purposes of this example all line losses have been considered negligible, as well as pressure drops across the various orifices. In the lower half of the table, for each of the six conditions shown in the upper half of the table, there is indicated the work performed (in horsepower) at the primary and auxiliary load circuits, as well as a comparison of pump power consumption for the "Prior Art" system and the system of the Invention. The prior art system is assumed to comprise one pump and one flow control valve having primary and auxiliary outlet ports. Under each of the headings "Prior Art" and "Invention" is a column labeled "U" which expresses the useful work at the primary and/or auxiliary load circuits as a percentage of the power consumed by the pump.

| | Primary | | Auxiliary | | INVENTION | | | | | | | | 65 |
| | | | | | 25 | | 27 | | 25a | | 27a | | |
| No. | Load | Q | Load | Q | Press. | Q | Press. | Q | Press. | Q | Press. | Q | Pos. |
| 1 | 2000 | 20 | 1000 | 40 | 2000 | 20 | 1000 | 10 | 0 | 0 | 1000 | 30 | F.3 |
| 2 | 2000 | 30 | 1000 | 30 | 2000 | 30 | 0 | 0 | 0 | 0 | 1000 | 30 | F.2 |
| 3 | 2000 | 40 | 1000 | 20 | 2000 | 30 | 0 | 0 | 2000 | 10 | 1000 | 20 | F.2 |
| 4 | 2000 | 60 | 0 | 0 | 2000 | 30 | 0 | 0 | 2000 | 30 | 0 | 0 | F.2 |
| 5 | 2000 | 0 | 1000 | 60 | 2000 | 0 | 1000 | 30 | 0 | 0 | 1000 | 30 | F.3 |
| 6 | 2000 | 30 | 0 | 0 | 0 | 0 | 0 | 0 | 2000 | 30 | 0 | 0 | F.2 |

| | Primary | | | Prior Art | | | | Invention | | | | | |
| Condition | | Aux. | | Pump | | U. | | 15 | | | 15a | | U. |
| No. | HP | HP | Press. | Q | HP | % | Press. | Q | HP | Press. | Q | HP | % |
| 1 | 23 | 23 | 2000 | 60 | 70 | 66 | 2000 | 30 | 35 | 1000 | 30 | 17 | 86 |
| 2 | 35 | 17 | 2000 | 60 | 70 | 74 | 2000 | 30 | 35 | 1000 | 30 | 17 | 86 |
| 3 | 46 | 11 | 2000 | 60 | 70 | 81 | 2000 | 30 | 35 | 2000 | 30 | 35 | 81 |
| 4 | 70 | 0 | 2000 | 60 | 70 | 100 | 2000 | 30 | 35 | 2000 | 30 | 35 | 100 |
| 5 | 0 | 35 | 2000 | 60 | 70 | 50 | 2000 | 30 | 35 | 1000 | 30 | 17 | 67 |
| 6 | 35 | 0 | 2000 | 30 | 35 | 100 | 0 | 0 | 0 | 2000 | 30 | 35 | 100 |

By comparing the utilization percentages of the prior art and of the invention, it may be seen that for condition nos. 3, 4, and 6, the theoretical efficiency of the prior art system is about equal to that of the invention, while for the remaining conditions (representing the more common operating situations), the percentages for the prior art system are substantially lower than for those of the invention.

Figure 4:
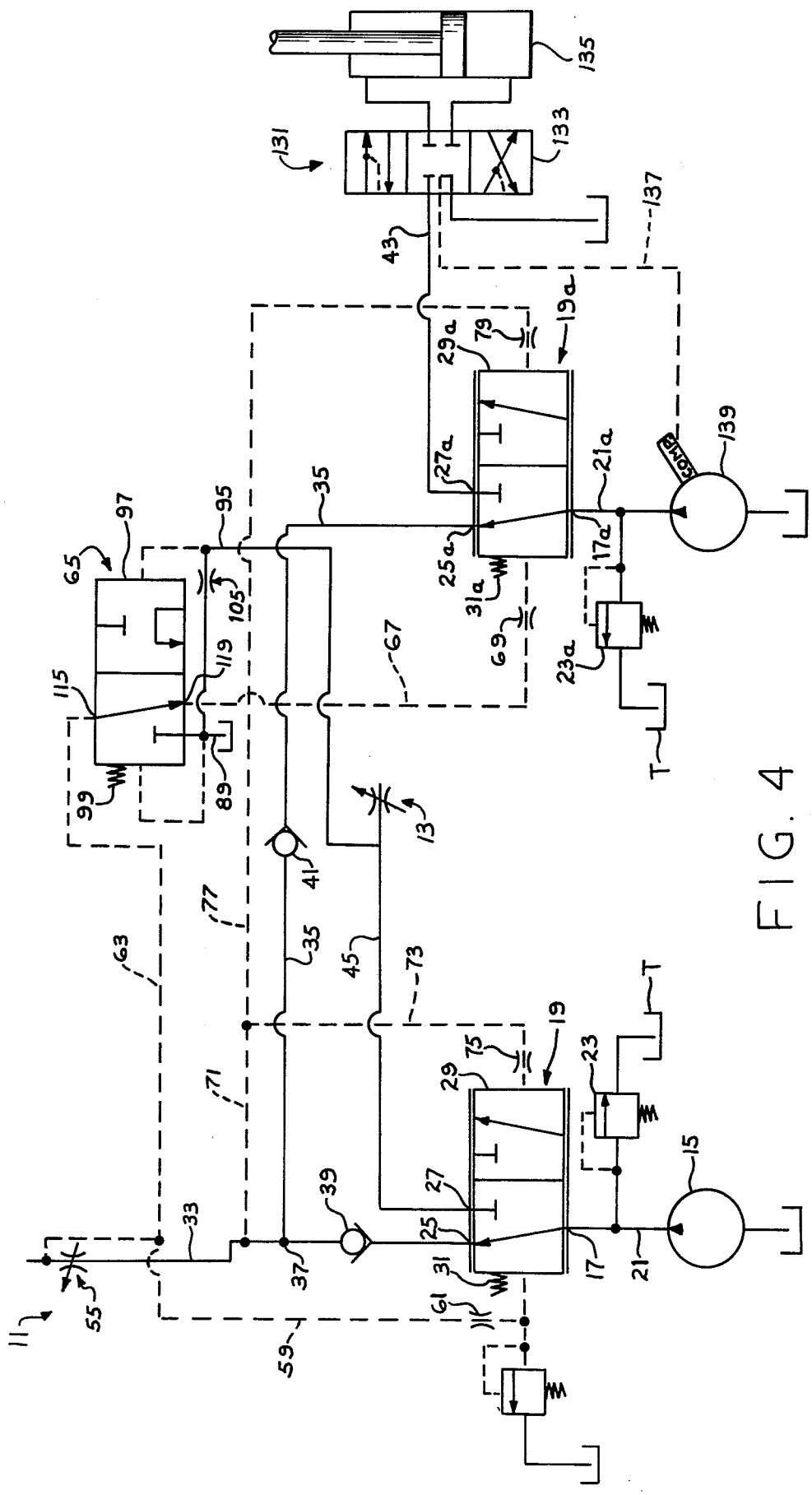
FIG. 4 is a hydraulic schematic, similar to FIG. 1, illustrating an alternative embodiment of the present invention.

Referring again to the drawings, FIG. 4 is a schematic similar to FIG. 1, illustrating an alternative embodiment of the invention, with like elements bearing like numerals. In the illustration of FIG. 4, the primary load circuit 11 has been represented, for purposes of simplicity, by only the variable flow control orifice 55. In this embodiment, the auxiliary load circuit 13 has, as its sole supply of pressurized fluid, the auxiliary outlet port 27 of flow control valve 19. The auxiliary outlet port 27a of the flow control valve 19a provides pressurized fluid through fluid conduit 43 to a separate auxiliary load circuit, designated 131. The load circuit 131 includes, by way of example only, a conventional three-position, four-way flow control valve 133, the output of which is connected to the opposite ends of a hydraulic power cylinder 135. The valve 133 is illustrated as being of the load-sensing type and providing a load pressure signal in a signal line 137 to the compensator portion of a flow and pressure-compensated, variable displacement pump 139. It will be apparent to those skilled in the art that in the embodiment of FIG. 4, with two separate auxiliary load circuits 13 and 131, there is no need for both of the fluid pumps to be of the same type (i.e., fixed displacement, pressure compensated, or flow and pressure compensated). Otherwise, the system will still operate in substantially the same manner as previously described in connection with FIG. 1 such that the lack of pressure and flow in fluid conduit 45, and in conduit 95, will result in the pilot valve 65 being in the position shown in FIG. 2, permitting communication of the load pressure in signal line 63 to signal line 67. On the other hand, pressure and flow in fluid conduit 45, indicating that the fluid pump 15 is able to satisfy the flow demands of load circuit 11, results in the pilot valve 65 being in the position shown in FIG. 3, such that the entire output of variable displacement pump 139 goes to auxiliary load circuit 131. Therefore, as used herein, the term "auxiliary load circuit means" will be understood to mean and include one load circuit (13) as in FIG. 1, as well as two or more (13 and 131) as shown in FIG. 4.

From a review and understanding of the foregoing description, it should be apparent that various other alternative embodiments are within the scope of the invention and taught herein. For example, in view of these teachings, it would be obvious to provide a system having three pumps and three flow control valves feeding a primary load circuit and an auxiliary load circuit or three pumps and three flow control valves feeding a primary load circuit, a first auxiliary load circuit and a second auxiliary load circuit. In the latter case, all three sub-systems could be capable of feeding the primary load circuit, or, only the first two sub-systems could feed the primary load circuit with the third sub-system being capable of feeding only the first and second auxiliary circuits. In that event, it would be possible to arrange the first and second auxiliary load circuits such that the first auxiliary circuit would take priority over the second auxiliary circuit.

These and various other alterations and modifications will occur to others upon a reading of the specification and it is my intention to include all such alterations and modifications as part of the invention insofar as they come within the scope of the appended claims.

I claim:

1. A system for providing pressurized fluid to a primary load circuit end to an auxiliary load circuit means, the primary load circuit including means providing at least one load pressure signal representative of the demand for fluid pressure and flow by the primary load circuit, said system comprising:
    a. a first sub-system including a first source of pressurized fluid and a first valve means operable in response to variations in the load pressure signal to control the flow of fluid from said first fluid source to the primary load circuit to satisfy the demand for fluid thereby, and to port excess fluid to the auxiliary load circuit means when the fluid demand by the primary load circuit is less than the output capacity of said first fluid source;
    b. a second sub-system including a second source of pressurized fluid and a second valve means operable in response to variations in the load pressure signal to control the flow of fluid from said second fluid source to the primary load circuit to satisfy any demand for fluid thereby in excess of the output capacity of said first fluid source and to port any excess fluid from said second fluid source to the auxiliary load circuit means; and
    c. third valve means operable to communicate the load pressure signal to said second valve means to cause said second valve means to be responsive thereto, when said first valve means is porting all of the fluid from said first fluid source to the primary load circuit, and to block the communication of the load pressure signal to said second valve means when said first valve means is porting excess fluid from said first fluid source to the auxiliary load circuit means, the load pressure signal acting on said second valve means being relieved to tank by said third valve means.

2. A system as claimed in claim 1 wherein said first valve means includes means biasing said valve means toward a position permitting substantially all of the flow from said first fluid source to pass to said primary load circuit.

3. A system as claimed in claim 1 wherein said second valve means includes means biasing said valve means toward a position permitting substantially all of the flow from said second fluid source to pass to said primary load circuit.

4. A system as claimed in claim 1 wherein said third valve means includes means biasing said valve means toward a position permitting communication of the load pressure signal to said second valve means.

5. A system as claimed in claim 4 wherein said third valve means is subjected to a biasing force, in opposition to that exerted by said biasing means, said biasing force comprising the pressure exerted by fluid being communicated from said first valve means to the auxiliary load circuit means, said biasing force biasing said valve means toward a position blocking communication of the load pressure signal.

6. A system for providing pressurized fluid, on demand, to a primary load circuit and to an auxiliary load circuit means, the primary load circuit including means providing a load pressure signal representative of the demand for fluid by the primary load circuit, said system comprising:
    a. a first source of pressurized fluid;
    b. first flow control valve means including an inlet port in fluid communication with said first fluid source, a first primary outlet port, a first auxiliary outlet port, and first means biasing said valve means toward a position permitting substantially all of the flow from said inlet port to pass to said first primary outlet port;

c. first primary fluid conduit means communicating between said first primary outlet port and the primary load circuit;

d. auxiliary fluid conduit means communicating between said first auxiliary outlet port and the auxiliary load circuit means;

e. a second source of pressurized fluid;

f. second flow control valve means including an inlet port in fluid communication with said second fluid source, a second primary outlet port, a second auxiliary outlet port in fluid communication with the auxiliary load circuit means, and second means biasing said valve means toward a position permitting substantially all of the flow from said inlet port to pass to said second primary outlet port;

g. second primary fluid conduit means communicating between said second primary fluid outlet and said first primary fluid conduit means;

h. means communicating a pressure signal from said first primary fluid conduit means to exert a biasing force on each of said first and second flow control valve means in opposition to that of said first and second biasing means, respectively;

i. first means communicating the load pressure signal from the primary load circuit to exert a biasing force on said first flow control valve means in the same direction as said first biasing means;

j. second means communicating the load pressure signal to exert a biasing force on said second flow control valve means in the same direction as said second biasing means; and k. third valve means disposed in said second signal communicating means and including an inlet port, a signal port, a tank port, and third means biasing said valve means toward a position permitting communication of said load pressure signal, and means communicating a pressure signal from said auxiliary fluid conduit means to exert a biasing force on said third valve means in opposition to that exerted by said third biasing means and toward a position blocking communication of said load pressure signal and relieving said load pressure signal at said second flow control valve means.

7. A valve assembly adapted to control the communication of a load pressure signal from a first load circuit to a valve means in response to the flow of pressurized fluid from a fluid source to a second load circuit through conduit means, said valve assembly comprising:

a. a housing defining a fluid inlet port adapted to receive said load pressure signal from the first load circuit, a signal port to be connected in fluid communication with the valve means, a tank port, a pressure port adapted to communicate with the conduit means and a valve bore;

b. valve means disposed in said valve bore, said valve means defining first fluid passage means disposed to communicate fluid from said pressure port to said tank port and second fluid passage means in continuous fluid communication with said first fluid passage means;

c. means biasing said valve means toward a position permitting fluid communication between said fluid inlet port and said signal port and blocking communication between said signal port and said second fluid passage means; and d. said valve means being subjected to a biasing force, in opposition to that exerted by said biasing means, by fluid at said pressure port, and, when the fluid pressure at said pressure port overcomes said biasing means, said valve means being moved to a position blocking fluid communication between said fluid inlet port and said signal port and permitting fluid communication between said signal port and said second fluid passage means.

* * * * *

UNITED STATES PATENT AND TRADEMARK OFFICE
CERTIFICATE OF CORRECTION

PATENT NO. : 4,044,786

DATED : August 30, 1977

INVENTOR(S) : James K. Yip

It is certified that error appears in the above-identified patent and that said Letters Patent are hereby corrected as shown below:

In the Abstract, line 15: "then" should read "than".

Col. 5, lines 7 & 9: "some" in all instances should read "same".

Signed and Sealed this

Twentieth Day of December 1977

[SEAL]

Attest:

RUTH C. MASON
*Attesting Officer*

LUTRELLE F. PARKER
*Acting Commissioner of Patents and Trademarks*